United States Patent [19]

Pollner et al.

[11] Patent Number: 4,836,734

[45] Date of Patent: Jun. 6, 1989

[54] GROUND VEHICLE FOR MANEUVERING AIRCRAFT

[75] Inventors: Juergen Pollner, Munich; Gregor Trummer, Aschering; Peter Moelzer, Schwabhausen, all of Fed. Rep. of Germany

[73] Assignee: Krauss-Maffei A.G., Fed. Rep. of Germany

[21] Appl. No.: 174,502

[22] Filed: Mar. 28, 1988

[30] Foreign Application Priority Data

Mar. 27, 1987 [DE] Fed. Rep. of Germany ....... 3710045

[51] Int. Cl.$^4$ .............................................. B60P 3/11
[52] U.S. Cl. .................................................. 414/430
[58] Field of Search ................ 280/79.1 A; 180/14.1, 180/19.1; 414/426, 430, 537

[56] References Cited

U.S. PATENT DOCUMENTS

| | | | |
|---|---|---|---|
| 2,240,723 | 5/1941 | Stoehr | 414/428 X |
| 2,573,729 | 11/1951 | Pugh | 414/430 |
| 2,752,076 | 2/1957 | Miller | 414/429 X |
| 4,036,384 | 7/1977 | Johnson | 414/334 |
| 4,225,279 | 9/1980 | Boyer | 414/428 |
| 4,375,244 | 3/1983 | Morin | 180/14 C |

FOREIGN PATENT DOCUMENTS

| | | |
|---|---|---|
| 2812434 | 10/1978 | Fed. Rep. of Germany . |
| 3521429 | 12/1986 | Fed. Rep. of Germany . |
| 3534044 | 4/1987 | Fed. Rep. of Germany . |
| 3534045 | 4/1987 | Fed. Rep. of Germany . |
| 1454298 | 9/1966 | France . |
| 2395891 | 7/1977 | France . |
| 2452427 | 10/1980 | France . |
| 1579017 | 3/1978 | United Kingdom . |

Primary Examiner—Andres Kashnikow
Assistant Examiner—Kevin P. Weldon
Attorney, Agent, or Firm—Robert J. Koch

[57] ABSTRACT

A shunting vehicle for maneuvering aircraft on the ground equipped with an ascent and arresting device for the aircraft front undercarriages which overcomes the problem of the stepping out of the undercarriage in the upward direction and tilting off of the rear and, secondly, the problem of accepting front undercarriages equipped with stone guards. A pivoting ramp with automatically pivoting cams which pivot as a function of the pivoting motion of the ram is provided. Additional stationary and mobile elements of the arresting device prevent escape of the bow wheels in the upward or rearward directions. The ramp, and thus the cams, are actuated by a piston-cylinder unit, two toggle lever systems, and a sliding link guide.

20 Claims, 4 Drawing Sheets

GROUND VEHICLE FOR MANEUVERING AIRCRAFT

BACKGROUND OF THE INVENTION

1. Field of the Invention

The invention relates to a shunting or towing vehicle to maneuver aircraft on the ground, and particularly a vehicle equipped with an ascent and an immobilizing device.

2. Description of the Related Technology

DE-OS 28 12 434 shows a towing machine used exclusively for moving large aircraft It is intended for rapid towing of empty large aircraft over large distances. The bow wheels are rotatingly supported following their ascent on a ramp and an upward pivoting on the rear platform of the vehicle by a support plate and immobilized there by means of a stationary plate and two mobile plates. This support and immobilization arrangement for the bow wheels is expensive and does not provide adequate protection against so-called stepping out of the front undercarriage in the upward direction, which could lead to tipping of the rear of the aircraft. Furthermore, a device of this type has no front undercarriages with stone guards located in the lower area of the bow wheels, can be immobilized as there is no space available for such stone guards. This space contains a pivotingly supported rear plate, which is drawn by pressure cylinders against the bow wheels.

The vehicle described above is not suitable for the multiple requirements posed relative to shunting vehicles for the purpose of maneuvering aircraft on the ground and is not economical for smaller aircraft.

SUMMARY OF THE INVENTION

It is an object of the invention to provide a shunting vehicle for safe transportation of loaded or unloaded aircraft on the ground. The vehicle advantageously has a front undercarriage receiving system for prevention of aircraft stepping out upwards and tilting off of the rear. The vehicle is also adapted to receive aircraft front undercarriages equipped with stone guards.

This object is attained by a shunting or towing vehicle according to the invention designed particularly to maneuver aircraft. The undercarriage of the vehicle is equipped with a platform and ascent or lifting apparatus and an arrangement to arrest, receive, and immobilize the front or bow of an aircraft. This arrangement is designed to effectively raise the aircraft and couple it to the shunting vehicle prior to maneuvering the aircraft. The ascent structure includes a pivoting ramp articulated onto the platform. The lifting arrangement includes a piston-cylinder unit for pivoting the ramp. The arresting device is a multi-element structure which holds an aircraft wheel including both stationary and moving elements, which fix and hold the front undercarriage of an aircraft on the shunting vehicle. The pivoting ramp is equipped with one or more mobile cams In the outpivoted terminal position of the ramp the cams are planar with the ascent surface of the ramp. In the raised terminal position of the ramp the cams may be swivelled out from the ramp plane and pressed against the aircraft bow wheels and immobilize the aircraft. The arresting device including the pivoting cams prevent the escape of the bow wheels particularly in the upward and rearward directions.

Cams located in a ramp are laid out, according to the invention, to pivot upwards and press against the bow wheels together with additional stationary and mobile elements of an arresting arrangement, to prevent escape of the bow wheels particularly in the upward and rearward directions. The layout according to the invention makes it possible to accommodate front undercarriages equipped with guards.

In an advantageous embodiment of the invention, the cams may be pivoted out and arrested automatically as a function of the pivoting motion of the ramp. A shaft is arranged and bearingly supported within the ramp. A lever is fastened in a rotatingly elastic manner to one or both ends of the shaft. A free end of the lever carries a roll or a sliding piece guided in a connecting link located on the vehicle frame. A lever is fastened to the shaft. The opposite end of the lever is articulated with a second lever which is articulated onto one of the cams in the area of the clamping surface The shaft, guide, lever arrangement is laid out so that upward pivoting of the ramp swivels the cams out of the ramp and the two levers may be immobilized in a high terminal position of the ramp in a stable position beyond their extended position and capable of being stressed in compression. Each of the connecting links has a guiding groove with a vertical, an oblique straight, and a circular arc-shaped part.

The cams may be actuated by a common shaft, wherein a rotationally elastic lever attached to one or both ends of said shaft is guided by a roll or sliding piece in slide links mounted outside in the frame. The guiding groove of the slide links is configured with a vertical, a straight oblique, and a circular arc-shaped part. The vertical part of the guide groove in combination with the prestressing of a rotationally elastic lever assures that the cams cannot pivot out upon ascent of the bow wheels onto the ramp. They assure a chatter-free cam position during the run-up process.

This layout may also compensate for deformations caused by structural tolerances, tire wear, etc., and loading of the front undercarriages.

The obliquely extending straight part of the guiding groove effects a rapid and synchronized swivel of the cams during upward pivoting motion of the ramp. The two knuckle joints of the levers are immobilized when the cams are completely swivelled out, i.e., in the upward pivoted position of the ramp, by a stable position beyond their full extension. This position prevents snapping in of the cams and thus a loss of clamping effect in case of external forces acting vertically downward from the front undercarriage. The circular arc-shaped part of the guide groove enables continuous adaptation of the cams to different sizes of bow wheels from the largest to the smallest wheel diameters, wherein the stable cam position is maintained independently of the pivoting angle of the ramp.

According to the invention, the ramp may be actuated by a piston rod of a piston-cylinder unit through a ramp knuckle joint system. This knuckle joint system is arranged so that in an outpivoted terminal position of the ramp, both knuckle joints are in extended positions. In the upwardly pivoted terminal position, they are at an acute angle relative to each other. As the result of the favorable kinematic lever arrangement according to the invention, the cylinder tensile force may be kept low in the initial position, i.e., when the full load of the bow wheels is on the ramp. A rapid swiveling motion of the ramp until the cams abut against the bow wheels is possible, whereby the cams act as clamping jaws to pressure and hold the wheels with a defined force.

A device may be provided on the front part of the frame bottom plate to act as a counter support for the cams and to hold the bow wheels in their position and secure them against "stepping out." An approximately vertical wall, optionally equipped with rollers, and a lever system with an initial predetermined prestress may function as the counter support for the cams. Upon approach of the bow wheel, the counter support applies itself in a terminal position passively against the bow wheel tires while climbing in accordance with the tire diameter. The levers are pressed by clamping cylinders with a defined force against the tires of the bow wheels when the terminal position is reached. The roller wall is advantageously equipped with one or more contact strips or terminal switches These indicate to the driver the end of the roll-up process, whereupon he may terminate the run-up and begin the clamping process.

In cooperation with the swiveling cams, the bow wheels are clamped in the terminal position in four locations in a plier-like manner. The bottom plate and the vertical roller wall passive support or clamping elements and the lever system and the swiveling cams are active support or clamping elements Advantageously, the ramp may be equipped with one or more distance sensors, preferably scanning roller levers A constant distance between the ramp and the ground may be maintained during aircraft receiving and discharge operations by operation of the distance sensors and a control installation, i.e., the ramp may be maintained above predetermined limiting distance from the ground. The control path required is contained in the vertical part of the guide groove in the sliding link. Rotationally elastic mounting of levers guided in the link on the shaft supported the cams without chatter within the control path in the ramp and prevent swivel out within this range from the ramp, i.e., the top side of the cams remains in the plane of the top side of the ramp, independently of spacing corrections, during the entire run-up process.

The vehicle may be pulled advantageously against the bow wheels by a rope winch, until the wheel abuts the roller wall with a predetermined force. The linked aircraft and towing vehicle is then ready to move. If empty airplanes are to be secured against stepping out or rear tilting during the run-up process, use of the rope winch is advantageous. The rope winch may be advantageously used to mount aircraft on which the entire rear area of the bow wheels is covered by stone guards.

An embodiment of the invention is shown in the drawings.

DETAILED DESCRIPTION OF THE PREFERRED EMBODIMENT

Figure 1:
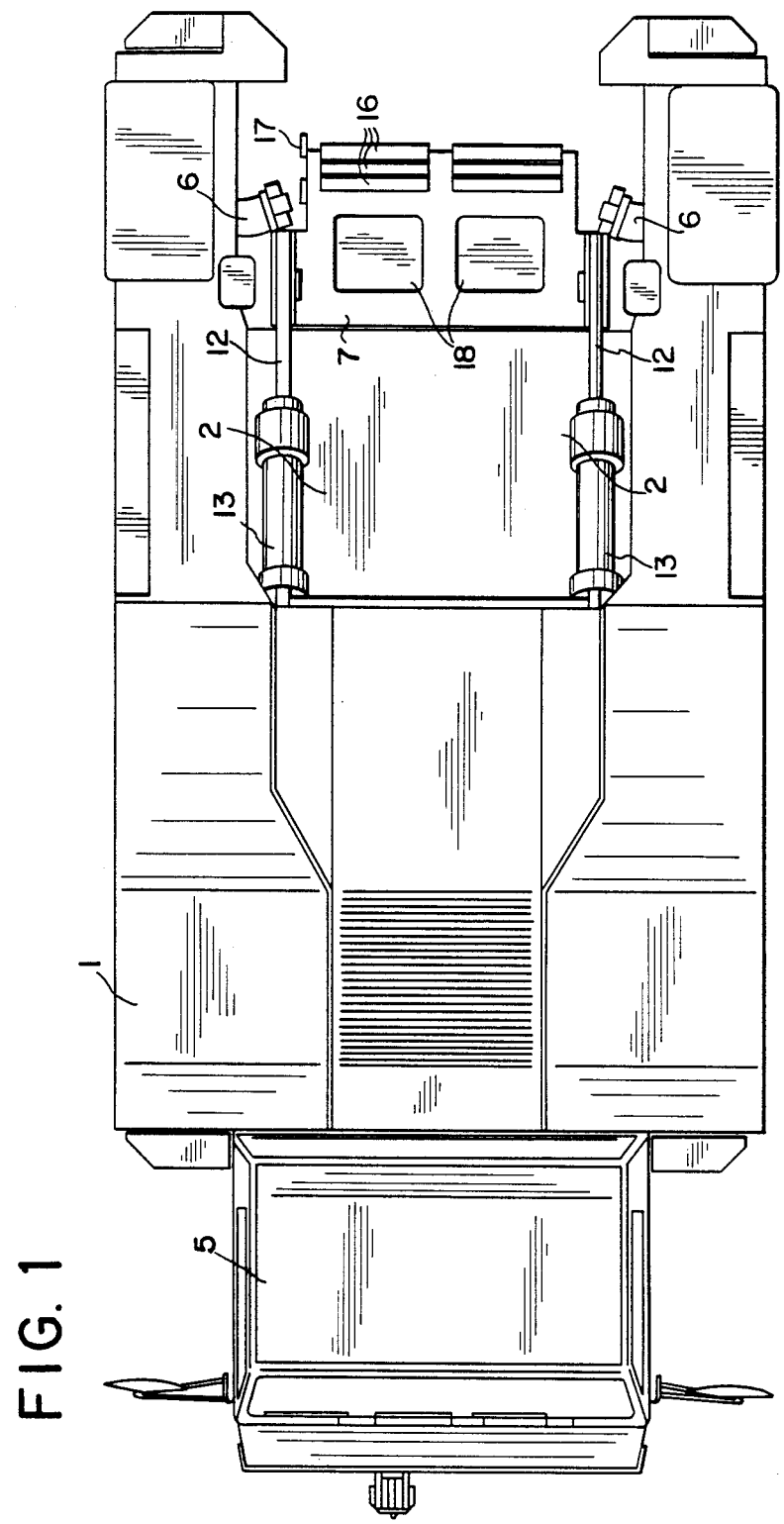
FIG. 1 shows a shunting vehicle with a run-up device in the out-pivoted terminal position of the ramp, in a top elevation.

The shunting vehicle is based on an open frame 1 with a bottom plate running nearly to the rear axle. There are two front wheels 3, two rear wheels 4, and a driver compartment 5 attached to the frame 1. All four wheels are driven through a hydrostatic gear by hydromotors 6. The hydromotors 6 are driven in turn through an annular line (not shown) by a source of pressure.

A ramp 7 is articulated on journals 8 on both sides of the bottom plate 2. A lever 10 is articulated onto ramp 7 ad supported by journal 9 and a swivel joint 11 connected to a piston rod 12 of a piston-cylinder unit 13 on each side of the ramp. The piston cylinder units 13 pivot on journals in the frame 1. A second lever 14 is articulated in the swivel joint 11 onto the piston rod 12. At their other end, the levers 14 are supported rotatingly on the journals 15, which are mounted stationarily on the frame 1. The levers 10 and 14 thus act as toggle levers on the ramp 7 and may be actuated by the piston-cylinder units 13.

Three rolls 16 are supported rotatingly on the free end of the ramp 7. The outer rolls have a smaller diameter than the two inner rolls, in order to minimize the longitudinal loads. A scanning roller lever 17 operating as a distance sensor is installed on the ramp 7.

Figure 3:
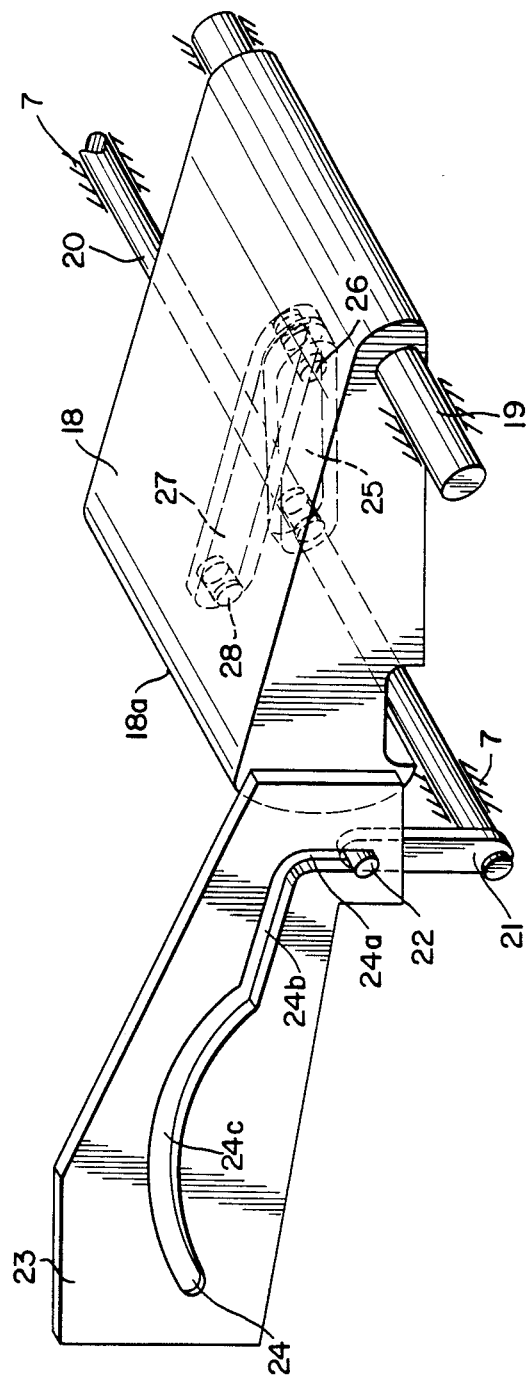
FIG. 3 shows a schematic, enlarged view of a cam in the swivelled in position in the ramp, with a lever system for automatic swiveling and arresting.

Finally, two cams 18 pivot around a rotating axle 19 on the ramp 7. As shown in FIG. 3, a shaft 20 is supported in the ramp 7. Both ends of the shaft 20 carry a lever 21 mounted in a rotationally elastic manner. A free end of each lever 21 carries a pin or roll 22 guided in a sliding link 23 located on the frame 1. Each of the sliding links 23 exhibits a guide groove 24 with a vertical portion (24a), an oblique straight portion (24b) and a circular arc-shaped portion (24c). A knuckle joint lever 25 for cam 18 is mounted on the shaft 20. A free end of each knuckle joint is articulated at a pivot joint 26 with another knuckle joint lever 27, which in turn is articulated on a journal 28 to each cam 18. The cams 18 have recesses 18a, so that adequate free space is available so that the shaft 20 does not interfere with the cams 18 pivoting into the ramp 7.

A vertical wall 29 is fixedly connected to the front part of the bottom plate 2 as a counter support for the bow wheels 30. The wall 29 is equipped with rollers 31 and contact strips 29b or terminal switches 29a. One or more clamping cylinders 32 are located on the bottom plate 2. Each clamping cylinder is articulated onto a lever 33. Each lever 33 is equipped with a roller blade 34 to facilitate climbing, particularly in the case of bow wheels with larger diameters, and to protect the tires by avoiding edge pressures. A second lever 35 is articulated onto an end of each lever 33 and pivot supported in stationary journals 36 in the frame 1.

A rope winch 37 is located on the front part of the bottom plate 2.

The mode of operation of the above-described layout is as follows.

Figure 2:
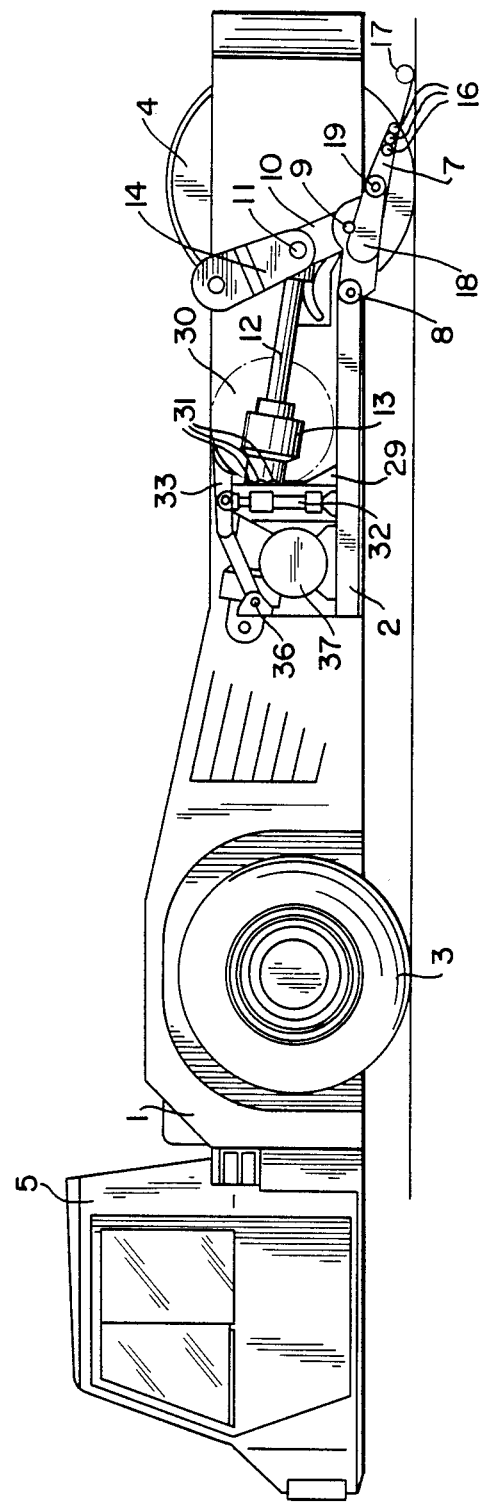
FIG. 2 shows a lateral elevation of the shunting vehicle according to FIG. 1 with parts of the arresting device and bow wheel position illustrated.

The driver moves the shunting vehicle with the rear forward to the front undercarriage parallel to the longitudinal axis of the aircraft. The ramp 7 is in an outpivoted terminal position and is lowered (FIG. 2). The cams 18 close off the run-up surface of the ramp 7 in a flush manner. The ramp 7 is now pressured slowly together with the rolls 16 under the bow wheels 30, whereupon the latter climb automatically onto the ramp, beginning at a predetermined longitudinal force.

The scanning roll lever 17 assures in combination with a control system (not shown) that the ramp 7 maintains a constant distance from the ground. The control path required is included in the vertical part 24a of the slide link 23. In the course of their subsequent movement, the bow wheels 30 roll over the inclined plane of the ramp 7 onto the bottom plate 2 within the ramp 1, until they contact the contact strips or terminal switches of the vertical wall 29. The lever 33 provided with a defined prestress, apply themselves together with the roll blades 34, upon the approach of the bow wheels passively against the tires of the latter and climb up as a function of the tire diameter. The contact strips or terminal switches indicate to the driver the completion of the run-up process, whereupon he terminates the movement and begins the clamping process. The bow wheels 30 are clamped in essentially by four elements, which grip the bow wheels in four locations in the terminal position like pliers. The bottom plate 2 and the vertical wall 29 with its rollers 31 passively participate in the clamping process. The levers 33 with roll blades 34 and pivoting cams 18 actively clamp the bow wheels. The clamping process is initiated by the actuation of the piston-cylinder units 13; the piston rod 12, the articulated swivel joint 11 and levers 10 and 14 are drawn forward. The ramp 7 is pivoted around a rotating axis defined by journals 8 to an upward position The cams 18 pivot automatically from their initial position (FIG. 3) recessed in the ramp 7 as follows. The rolls 22 are guided out on both sides from their initial position in the guide groove 24 by the upward pivoting of the ramp 7. In the process, a torque force is transmitted by the lever 21 to the shaft 20. This torque is transmitted by the shaft 20 to the lever 25 which is fixed to the shaft 20. The lever 25 actuates a hinge connected lever articulated at journals 28 onto the cams. The cams are thereby pivoted around their axle 19 of rotation. The sliding link guide 24 is configured so that its vertical part 24a in combination with the prestressing of the lever 21 assures a chatter-free seating of the cams 18 in the ramp 7. The obliquely upwards running part 24b effects a rapid swiveling of the cams into a stable position secured against buckling, while the subsequent circular arc-shaped part 24c enables the adaptation of the cams to different bow wheel diameters, from the smallest to the largest, in keeping with the curvature of the circular arc.

Figure 4:
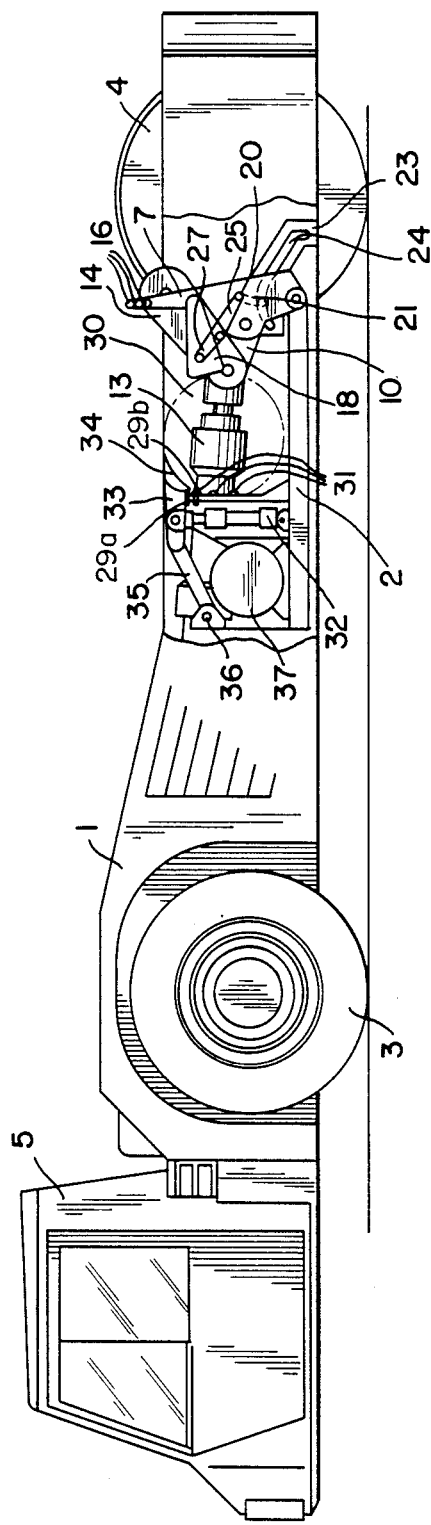
FIG. 4 shows the shunting vehicle according to FIG. 2, but in the upward pivoted terminal position of the ramp and the bow wheel immobilized.

The predetermined contact pressure of the cams 18 is generated by the piston-cylinder units 13 in combination with the toggle lever layout of the levers 10 and 14. As shown in FIG. 4, levers 25 and 27 are stable and beyond their extended position and prevent swiveling of the cams 18 when applied to the bow wheels 30 and thus loss of clamping action in case of outer forces acting vertically downward from the front undercarriage. The stable position of the cams 18 in the clamping position, is obtained by the direction of the prestressing of the elastic mounting of the lever 21 in combination with the slide link guidance 24.

Simultaneously with the application of the cams 18, the levers 33 with the roll blades 34 are pressured by the clamping cylinder 32 onto the tires of the bow wheels with a predetermined force.

The shunting vehicle is now ready to tow the aircraft. Following the completion of the towing operations, the bow wheels are released and roll off in a reverse sequence.

We claim:

1. A ground maneuvering aircraft shunting vehicle comprising:
   a platform connected to a vehicle frame;
   an ascent device connected to said platform comprising:
     a pivoting ramp articulated to said platform;
     means for lifting said ramp from an outpivoted terminal position to a raised terminal position; and
     means for immobilizing an aircraft wheel comprising:
       at least one pivoting cam mounted on said ramp; and
       means for pivoting said cam between a first position flush with an upper ramp surface when said ramp is in said outpivoted terminal position to a second position protruding from said ramp surface exposing a clamping surface when said ramp is in said raised terminal position.

2. A vehicle according to claim 1, wherein said means for pivoting further comprises:
   a transversely extending pivot axle mounting a cam portion opposing said clamping surface on said ramp; and
   means for synchronizing motion of said cam with motion of said ramp connected to said ramp.

3. A vehicle according to claim 2 wherein said means for synchronizing comprises:
   a connecting link connected to said frame;
   a first lever received and guided in said connecting link;
   a shaft rotationally elastically mounted on said first lever;
   a second lever connected to said shaft; and
   a third lever articulated to said second lever and said cam.

4. A vehicle according to claim 3, wherein said connecting link exhibits a guiding groove with a vertical portion, an oblique straight portion and a circular arc-shaped portion.

5. A shunting vehicle according to claim 3, further comprising an upper holding lever at a height corresponding to a bow wheel height, opposing said cams and cooperating with an approximately vertical wall connected to said frame as a stop for aircraft bow wheels.

6. A shunting vehicle according to claim 5, further comprising clamping cylinders connected to said upper holding lever and said platform and roller blades connected to said upper holding lever.

7. A shunting vehicle according to claim 5, further comprising contact strips or terminal switches located on said wall to signal the completion of the roll-in process of the bow wheels.

8. A shunting vehicle according to claim 5, further comprising one or more distance sensors connected to said ramp.

9. A vehicle according to claim 1, wherein said means for lifting comprises:
   a piston and cylinder unit connected on opposing sides of said ramp to said frame;
   a two lever knuckle joint articulated at a center pivot connected to a piston rod of a corresponding piston cylinder unit on opposing sides of said ramp wherein a first end of said knuckle joints is connected to said frame and an opposite second end of said knuckle joints is connected to said ramp and wherein said knuckle joint levers are in an extended position when said ramp is in said outpivoted terminal position.

10. A vehicle according to claim 3, wherein said means for lifting comprises:
   a piston and cylinder unit connected on opposing sides of said ramp to said frame;
   a two lever knuckle joint articulated at a center pivot connected to a piston rod of a corresponding piston cylinder unit on opposing sides of said ramp wherein a first end of said knuckle joints is connected to said frame and an opposite second end of said knuckle joints is connected to said ramp and wherein said knuckle joint levers are in an extended position when said ramp is in said outpivoted terminal position.

11. A shunting vehicle according to claim 3, further comprising one or more distance sensors connected to said ramp.

12. A shunting vehicle according to claim 1, further comprising an upper holding lever at a height corresponding to a bow wheel height, opposing said cams and cooperating with an approximately vertical wall connected to said frame as a stop for aircraft bow wheels.

13. A shunting vehicle according to claim 12, further comprising clamping cylinders connected to said upper holding lever and said platform and roller blades connected to said upper holding lever.

14. A shunting vehicle according to claim 3, further comprising contact strips or terminal switches located on said wall to signal the completion of the roll-in process of the bow wheels.

15. A shunting vehicle according to claim 1, further comprises one or more distance sensors connected to said ramp.

16. A vehicle according to claim 13, wherein said means for lifting comprises:
   a piston and cylinder unit connected on opposing sides of said ramp to said frame;
   a two lever knuckle joint articulated at a center pivot connected to a piston rod of a corresponding piston cylinder unit on opposing sides of said ramp wherein a first end of said knuckle joints is connected to said frame and an opposite second end of said knuckle joints is connected to said ramp and wherein said knuckle joint levers are in an extended position when said ramp is in said outpivoted terminal position.

17. A shunting vehicle according to claim 16, further comprising a rope winch located on said vehicle.

18. A shunting vehicle according to claim 3, further comprising a rope winch located on said vehicle.

19. A shunting vehicle according to claim 1, further comprising a rope winch located on said vehicle.

20. A vehicle according to claim 9, wherein said knuckle joint levers are at an acute angle relative to each other when said ramp is in said raised terminal position.

* * * * *